(12) United States Patent
Quan et al.

(10) Patent No.: US 8,468,049 B2
(45) Date of Patent: Jun. 18, 2013

(54) SYSTEMS AND METHODS FOR PROVIDING DIRECT COMMUNICATION FROM PERSONALIZED TARGETED ADVERTISEMENTS

(75) Inventors: Kenneth Quan, Oakland, CA (US); Chon Fong Lei, Daly City, CA (US); Kai Pong Lei, Sunnyvale, CA (US); Angelique Lausier, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1134 days.

(21) Appl. No.: 12/034,583

(22) Filed: Feb. 20, 2008

(65) Prior Publication Data
US 2009/0210270 A1    Aug. 20, 2009

(51) Int. Cl.
*G06Q 30/00*    (2012.01)
(52) U.S. Cl.
USPC ...... 705/14; 705/14.4; 705/14.45; 705/14.53; 705/14.54; 705/14.55

(58) Field of Classification Search
None
See application file for complete search history.

(56) References Cited

U.S. PATENT DOCUMENTS

| | | | |
|---|---|---|---|
| 2005/0165638 A1* | 7/2005 | Piller | 705/14 |
| 2009/0119165 A1* | 5/2009 | Cotgreave | 705/14 |

\* cited by examiner

*Primary Examiner* — Rajesh Khattar
(74) *Attorney, Agent, or Firm* — Martine Penilla Group, LLP

(57) ABSTRACT

A method of creating a personalized targeted advertisement for displaying on a webpage of a website is disclosed. The personalized targeted advertisement includes features to provide direct communication between a sender and a recipient of the personalized targeted advertisement. A selection of an advertisement template from a plurality of advertisement templates is detected. Then, a media file and a custom message are received to build the personalized targeted advertisement. The personalized targeted advertisement is then sent to the recipient identified by a unique identification. The advertising server is notified so that the personalized targeted advertisement can be displayed when the recipient identified by the unique identification logs into the website.

19 Claims, 10 Drawing Sheets

SYSTEMS AND METHODS FOR PROVIDING DIRECT COMMUNICATION FROM PERSONALIZED TARGETED ADVERTISEMENTS

CROSS REFERENCE TO RELATED APPLICATIONS

This Application is related to co-pending U.S. patent application Ser. No. 11/159,456, filed on Jun. 23, 2005, entitled "Method and Apparatus for Generating Targeted Advertisements," which is incorporated herein by reference for all purposes.

FIELD OF THE INVENTION

This invention generally relates to online advertising. More specifically but without limitation, this invention relates to providing direct communication between a sender and a receiver from within the targeted advertising.

BACKGROUND OF THE INVENTION

The computing industry has seen many advances in recent years, and such advances have produced a multitude products and services. Internet websites are examples of products and services, which are created to give users access to particular types of services, data, or searching capabilities. The providers of the Internet websites are increasingly adapting online advertising for generating revenue.

The Internet has emerged as an attractive new medium for advertisers of information, products and services ("advertisers") to reach not only consumers in general, but also to enable increased capabilities to identify and target specific groups of consumers based on their preferences, characteristics or behaviors. However, the Internet is composed of an unlimited number of sites dispersed across millions of different computer systems all over the world, and so advertisers face the daunting task of locating and targeting the specific groups or subgroups of consumers who are potentially interested in their information, products and/or services. These efforts are well worth their reward; however, as a well placed advertisement on a high traffic website may produce as many views as conventional print or television advertising. Even more important than just placing an Internet advertisement is the ability to target consumers who will actually observe and appreciate the content. Advertisers get far more "bang for their buck" by targeting advertisements, and are therefore willing to pay more money for this type of ad placement.

A common way for advertisers to target particular users is to purchase advertising space on a particular site. For example, many sites sell advertising space for banner ads. Banner ads are graphical images that are used on Web sites to advertise information, products or services. Banner ads usually conform to a standard size as agreed upon by the Interactive Advertising Bureau, or IAB (such as 460 pixels wide and 60 pixels tall). The use of a standard size enables developers to design a site that allows for the interchangeability of ads and also allows advertisers to use the same banner ad repeatedly. Typically, banner ads are sold per "impression," which is a particular instance of a banner. Unfortunately, traditional banner advertisement price structures are geared for advertisers seeking large audiences. In most cases, advertisers sell banner ad space per 1,000 impressions, leaving consumers and small business owners paying for needless impressions.

Current banner ads provide a limited way for advertisers to perform targeted marketing. For example, advertisers may be able to target specific users by choosing a site whose visitors' demographic information most closely matches the advertiser's targeted audience. Additionally, advertisers may determine a user's interest in certain areas from a user's page views or self declared information, such as demographics. However, these methods do not provide a complete view of a user's interests and their likely responses to advertisements. Using pages a user views or user demographic information does not provide an accurate measure as to whether a user would actually click on an advertisement and actually buy a product from the advertiser after clicking on the advertisement. Moreover, demographic information provides no guarantee that specific users exhibiting those characteristics actually see an advertisement.

It is within this context that embodiments of the invention arise.

SUMMARY OF INVENTION

Broadly speaking, the present invention fills these needs by providing methods and systems to enable direct two-way communication between the sender and the receiver of the targeted advertisement from within the targeted advertisement itself. The embodiments of the invention provide unique means of engaging the recipients of a personalized targeted advertisement. The embodiments also provide calls-to-action that allow the recipients to communicate directly from within the advertisement, rather than go through the steps of communicating in some other traditional ways.

The systems and methods described herein provide creation of a targeted advertisement using advertisement templates, custom messages, media file(s), etc. A user can create a personalized targeted advertisement and send to one or more recipients. When a recipient visits a website that is associated with a particular advertisement server, the visited webpage displays the personalized targeted advertisement that was created and sent by a sender. On the other hand, for a regular user of the website a regular "non-personalized" advertisement is displayed. The personalized targeted advertisement includes built in two-way communication features to enable one or more recipients to individually communicate with the sender without leaving the webpage or the targeted advertisement. Hence, there is a need for the methods and systems for enabling two-way direct communication from within the targeted advertisement because providing such functionality encourages the recipient to stay connected to the webpage for a relatively longer duration. As an added advantage, keeping the recipient on the webpage enhances the chances that the recipient would pay attention to other advertisements and information on the webpage.

In one embodiment, a method of creating a personalized targeted advertisement for displaying on a webpage of a website is disclosed. The personalized targeted advertisement includes features to provide direct communication between a sender and a recipient of the personalized targeted advertisement. A selection of an advertisement template from a plurality of advertisement templates is detected. Then, a media file and a custom message are received to build the personalized targeted advertisement. The personalized targeted advertisement is then sent to the recipient identified by a unique identifier. The advertising server is notified so that the personalized targeted advertisement can be displayed when the recipient identified by the unique identifier logs into the website. The personalized targeted advertisement is stored in a web server.

In another embodiment, a method of providing direct communication between a sender and a recipient of a personalized targeted advertisement on a webpage is disclosed. The method includes receiving the personalized targeted advertisement from an advertisement server. Receiving of the personalized targeted advertisement includes receiving a custom message that was entered by the sender of the personalized targeted advertisement and a media file. The receiving of the personalized targeted advertisement also includes receiving a plurality of Internet links, at least one of the plurality of Internet links enables communication between the sender and the recipient. An identification of an advertisement template is also received. The advertisement template is selected and set by the sender of the personalized targeted advertisement. An Object tag is build using the custom message, at least one of the plurality of Internet links, the media file, and the advertisement template. The Object tag is then included in HTML code of the webpage for displaying the personalized targeted advertisement.

In yet another embodiment, a system for providing a direct communication between a sender and a recipient of a personalized targeted advertisement on a webpage is provided. The webpage is hosted in a web server. A media file server is included to store and manage a plurality of media files associated with the personalized targeted advertisement. The media file server defined to be in communication with the web server. The system also includes an advertisement server in communication with the web server and a targeted advertisement generator module in communication with the advertisement server and the web server. The targeted advertisement generator module constructs an Object tag that is included in HTML code of the webpage.

The advantages of the present invention are numerous. Most notably, the system and methods described herein provide an efficient way of having users of a website stay on the website by providing the recipient a functionality to communicate with the sender of a personalized targeted advertisement without leaving the webpage or even the personalized targeted advertisement. Further, the advertisers or senders are also benefited because the recipients are more likely to pay attention to the content of a personalized targeted advertisement.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

The figures are provided in order to provide a thorough understanding of the present invention. The figures should not be construed as limiting the breath of the invention in any manner.

DETAILED DESCRIPTION

A method and system for providing direct communication between a sender and a receiver of a personalized targeted advertisement on a webpage is disclosed. A personalized targeted advertisement is a webpage advertisement in which the content is personalized and customized specifically for an intended recipient. The personalized targeted advertisement, inter alia, includes features to enable receiving the targeted advertisement, forward the targeted advertisement to another receiver, responding to the sender of the targeted advertisement, and creating a new targeted advertisement for sending to another receiver. The system also provides a template based target advertisement creation. In one example, a media file containing a picture or an audio-video can be attached to the template to create a customized targeted advertisement. In other example, a new template can be created by a sender.

One of the advantages of the embodiments of present invention described herein is that the embodiments provide unique means for engaging the recipient of a personalized targeted advertisement. The embodiments also provide calls-to-action that allow the recipients to respond directly within the advertisement rather than go through the steps of communicating in some other traditional fashion such as opening an email program, opening a compose window, clicking on a send button, etc. By providing a direct communication channel from the personalized targeted advertisement, the recipient is more likely to engage in communication with the sender of the personalized advertisement due to sheer ease of communication.

Further, the embodiments also serve to close a feedback loop, such that the sender of the personalized advertisement has an increased likelihood of knowing whether their intended recipient of the personalized advertisement has seen the advertisement. An added advantage for the sender of the personalized advertisement is that there is a feeling of gratification associated with knowing that the recipient has seen the advertisement. Still further, the sender may employ methods to track the receivers who have seen or not seen the targeted advertisements. In one example, the collected data may be used to design media campaigns on Internet.

With this overview in mind, the following figures will illustrate example structure and functionality of the system and method for providing direct communication between a sender and a receiver from within a personalized targeted advertisement.

Figure 1:
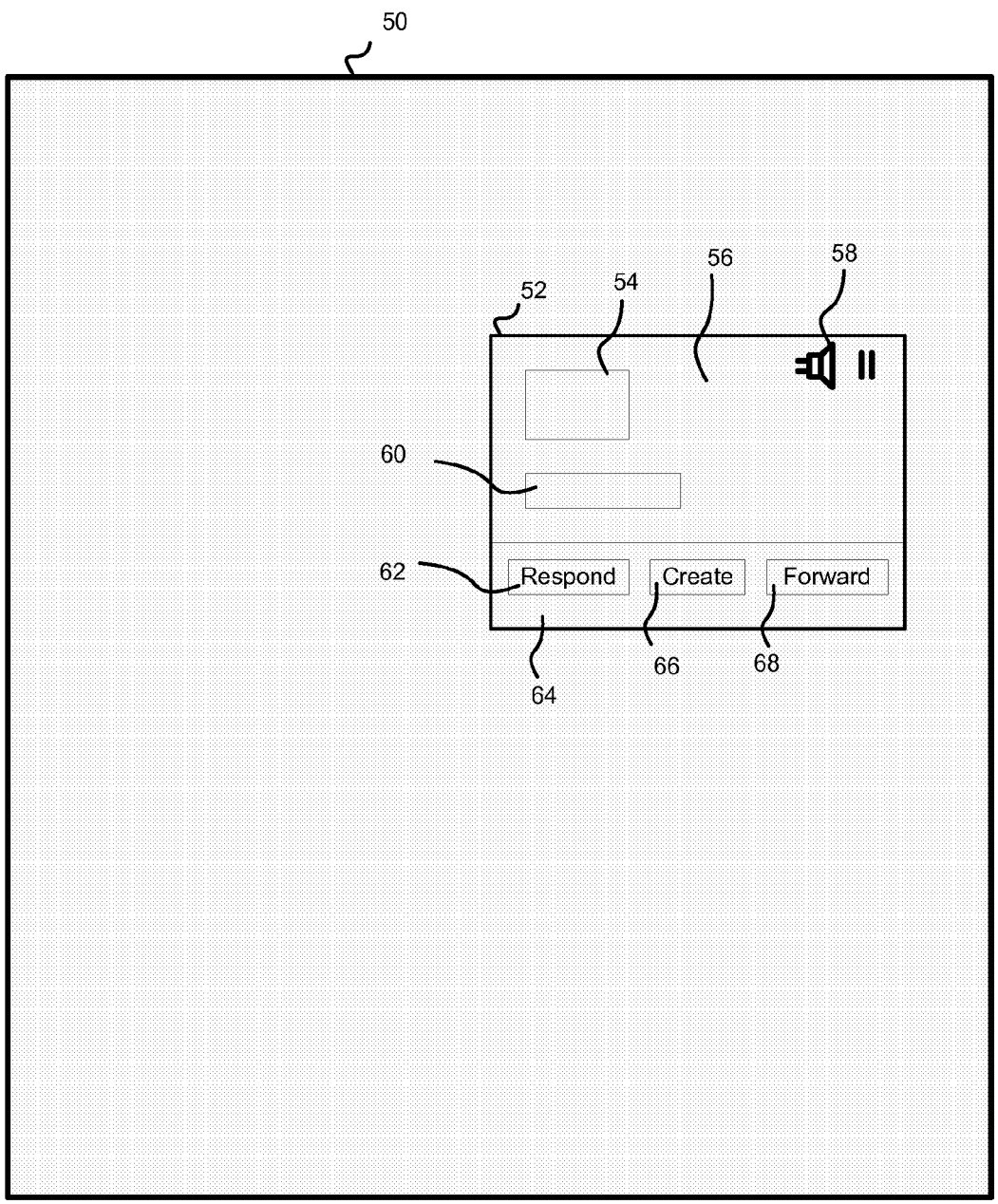
FIG. 1 illustrates an exemplary structure of a targeted advertisement being displayed in a webpage, in accordance with one embodiment of the present invention.

FIG. 1 illustrates structure of a personalized targeted advertisement 52, in one example. The personalized targeted advertisement 52 is displayed in a webpage 50 when an intended recipient of the personalized targeted advertisement visits the webpage 50. On the other hand, when a person who is not an intended recipient for the personalized targeted advertisement 52 visits the webpage 50, a personalized targeted advertisement 52 is not displayed. Instead, either a regular commercial advertisement may be displayed or a different personalized targeted advertisement created specifically for that particular person may be displayed.

The personalized targeted advertisement 52, in one embodiment, includes a custom media section 54 for displaying or playing a media file that was associated by the sender with the personalized targeted advertisement 52. The personalized targeted advertisement 52 further includes a custom text section 60 for displaying a message from the sender. A media area 56 is provided to display or play a media file that is provided by the template of the personalized targeted advertisement 52. The template of the personalized targeted advertisement 52 will be discussed in detail later in this document. A plurality of media controls 58 are provided to control playing of the media files. In other embodiments, one or more of these controls or sections may be omitted. Further, the structure of the personalized targeted advertisement 52 depends on the selected template. Therefore, the creator of the templates may add more sections, change positions of the sections, or omit one or more sections and controls as illustrated in FIG. 1.

Still referring to FIG. 1, the personalized targeted advertisement 52 further includes a communication controls section 64 which provides hosting space for various communication controls such as "Respond" 62, "Create" 66, and "Forward" 68. The names and functions of these controls 62, 66, 68 may be different in different embodiments. In one embodiment, these controls 62, 66, 68 are initially hidden while the communication controls section 64 displays the identification of the sender of the personalized targeted advertisement 52. In other embodiments, other controls may be included to provide other types of peer-to-peer type of communication between the sender and the recipient, e.g., voice calling, instant messaging, etc.

Figure 2:
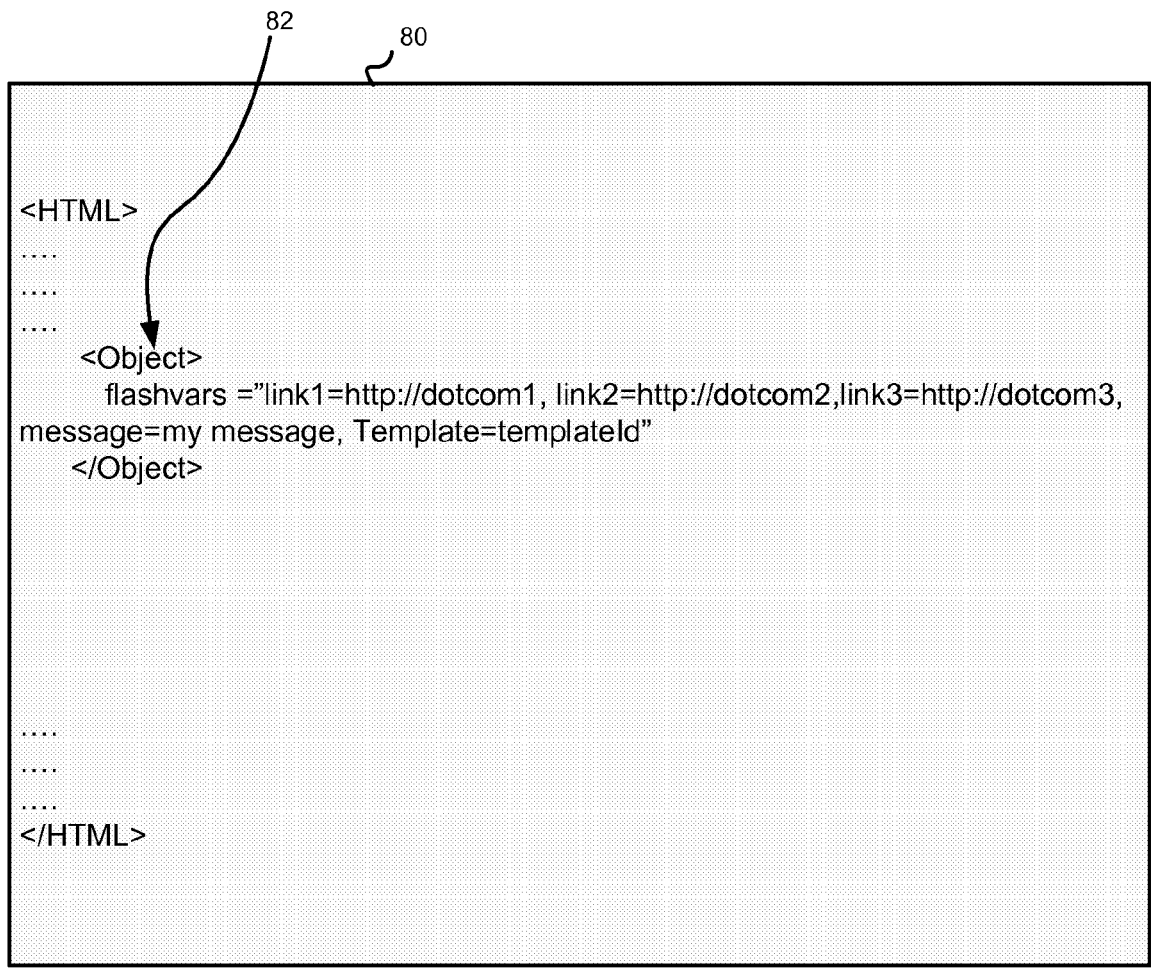
FIG. 2 illustrates an exemplary HTML code section including an Object tag for the targeted advertisement, in accordance with one embodiment of the present invention.

FIG. 2 illustrates an exemplary HTML code segment 80 including an Object tag 82 for creating the personalized targeted advertisement 52. The Object tag 82 is inserted into the HTML code 80 of the webpage 50 to associate Internet links with various controls and sections, as described in FIG. 1. In other embodiments, the structure of the Object tag 82 may be different so long as the Object tag includes necessary data to associate various controls and sections of the personalized targeted advertisement 52 with the Internet links and the custom message.

In one embodiment, the Object tag 82 includes the plurality of Internet links that can be associated with Respond 62, Create 66, and Forward 68 communication controls. Further, the Object tag 82 also supplies data that is necessary to provide communication features to enable the recipient to communicate with the sender of the personalized targeted advertisement 52. The Internet links are packed in a variable that is suitable for providing the input data to a Flash™ player web control on the webpage 50. It may be noted that in other embodiments, different commonly available web-media players may be used for displaying the personalized targeted advertisement 52 on the webpage 50. In other embodiments, the structure of the Object tag 82 can be adjusted to the requirements of a particular type of web-media player. Web-media Player is the standard for displaying media rich web content including web applications.

In one example, the Flash™ player reads the Object tag 82 and parses the data included in the exemplary "flashvars" variable (as shown in FIG. 2). The Flash™ player then retrieves and displays the targeted advertisement template as identified by the template variable in the flashvars variable. In one embodiment, the Flash™ player also retrieves the custom media file (not shown in FIG. 2) as identified in the Object tag 82 and plays or displays the custom media file at an appropriate place in the personalized targeted advertisement. Similarly, the custom message is displayed at an appropriate place in the personalized targeted advertisement 52. Further, the Internet links are associated with appropriate communication controls in the personalized targeted advertisement. In other examples, more operations may be added as prescribed by the template or one or more of above described operations may be omitted to suit the template design and features.

Figure 3:
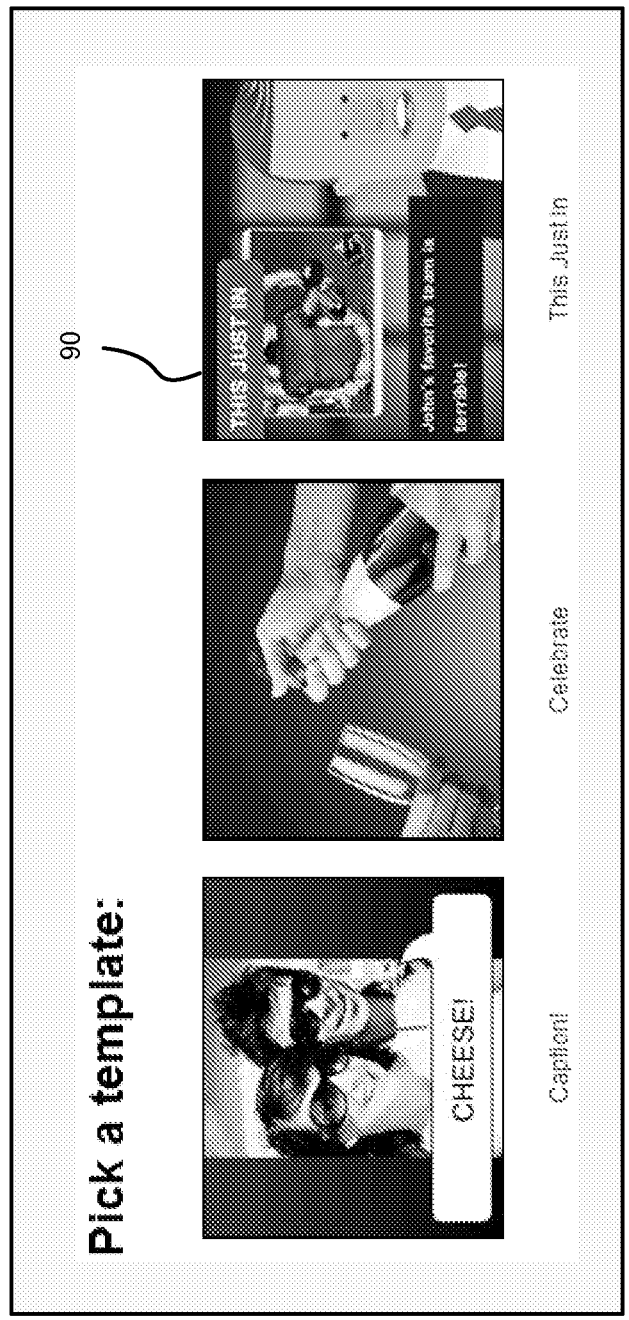
FIG. 3 illustrates a plurality of exemplary targeted advertisement templates, in accordance with one embodiment of the present invention.

FIG. 3 illustrates exemplary personalized targeted advertisement templates 90. The templates can be created by the senders of the personalized targeted advertisements. In other embodiments, the templates can also be created by a third party service provider such as Yahoo™. In one embodiment, a template 90 includes provision for displaying a personalized or custom message and provision for displaying or playing a media file. The media file may include one of a picture file, a video file, an audio-video file. In one embodiment, a fixed or customizable background image file is also provided. In other embodiment, the background can include an animated image or a media clip.

The templates 90 are used by the senders to create personalized targeted advertisements by providing necessary information as per the requirements of the selected template 90. In one embodiment, the personalized targeted advertisement creation can be performed programmatically using an Application Programming Interface (API) provided by the service provider of the personalized targeted advertisement system.

Figure 4:
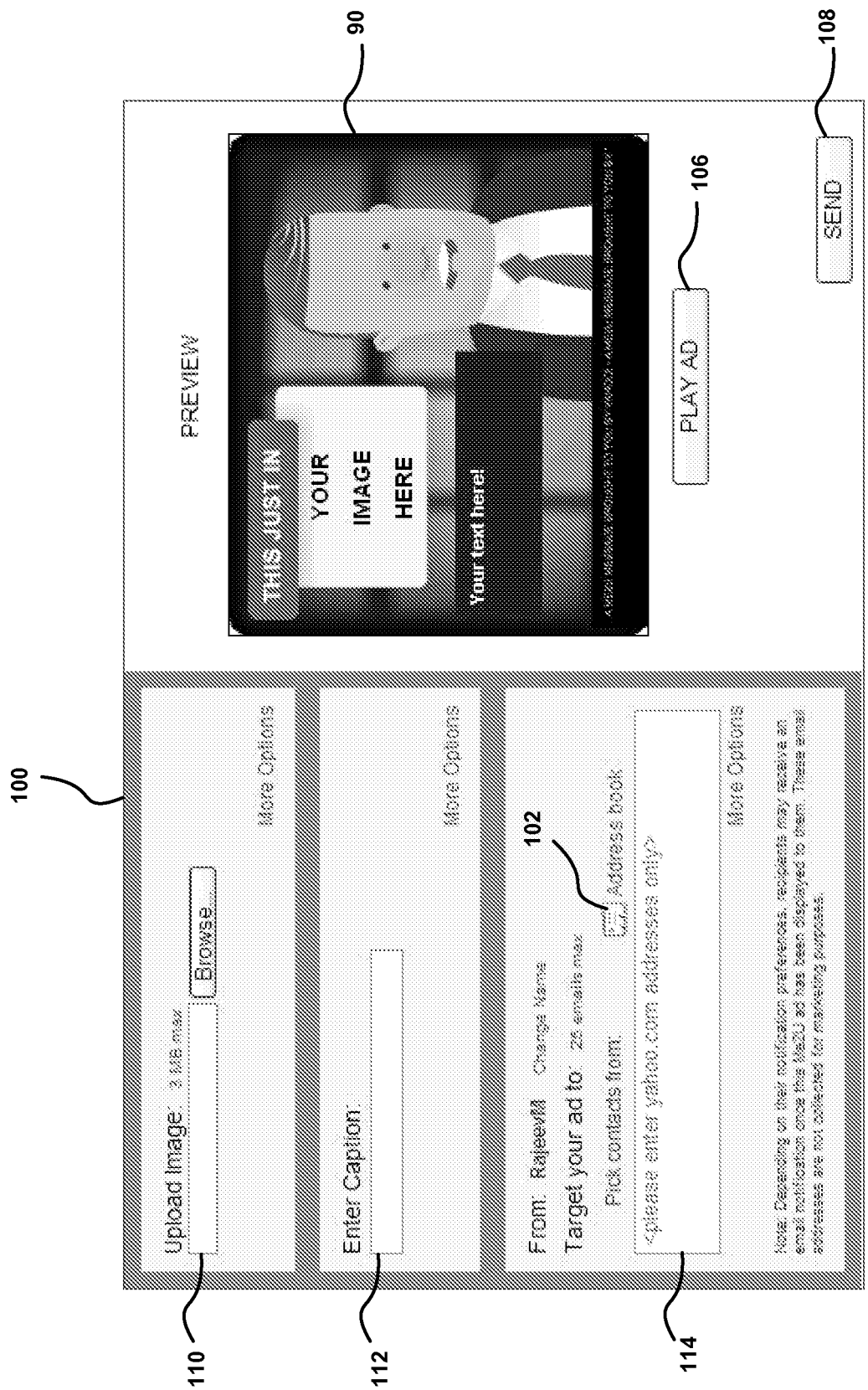
FIG. 4 illustrates an exemplary webpage for creation of a personalized targeted advertisement, in accordance with one embodiment of the present invention.

FIG. 4 illustrates an exemplary screen 100 to create a personalized targeted advertisement. To begin the process of creating a personalized targeted advertisement, the sender first selects a template 90. In one embodiment, a default template is provided, and this default template is automatically selected if no other template is selected by the sender. The design and structure of the screen 100 can be different in different embodiments. In one embodiment, the screen 100 includes an upload image box 110, a caption box 112 to enable entry of a custom or personalized message and an addressing box 114 to enable entry of email identities of the recipients. In one embodiment, other types of recipient identities such as website user identities (UserID or user name) can be used to uniquely identify each of the recipients. In one embodiment, the recipient identities may be retrieved from an electronic address book 102 of the sender. The image box 110 can also be used to upload various types of media file. A custom or personalized message, in one embodiment, can be in form an audio file.

In one embodiment, the advertisement creation screen 100 of FIG. 4 includes a preview area in which the selected template 90 is initially displayed. In this embodiment, the custom message entered in the caption box 112 is automatically displayed in the appropriate place in the template 90, per the design of the template 90. Similarly, the media file is also attached to the template 90 after the media file is uploaded. The play ad button 106 can be used to preview the personalized targeted advertisement. Finally, the personalized targeted advertisement is sent to the advertisement server by selecting the send button 108.

The creation of the personalized targeted advertisement, in one embodiment, is triggered when a user selects the create button 66 (FIG. 1). In other embodiment, the creation of a targeted advertisement can be accomplished by visiting an appropriate webpage provided by the service provider of the targeted advertisement system. In yet other embodiments, the creation of the personalized targeted advertisement as described above may also be performed programmatically with the use of an API provided by the targeted advertisement system. In one embodiment, the process of programmatically creating the personalized targeted advertisement is subjected to necessary checks to prevent spam.

Figure 5A:
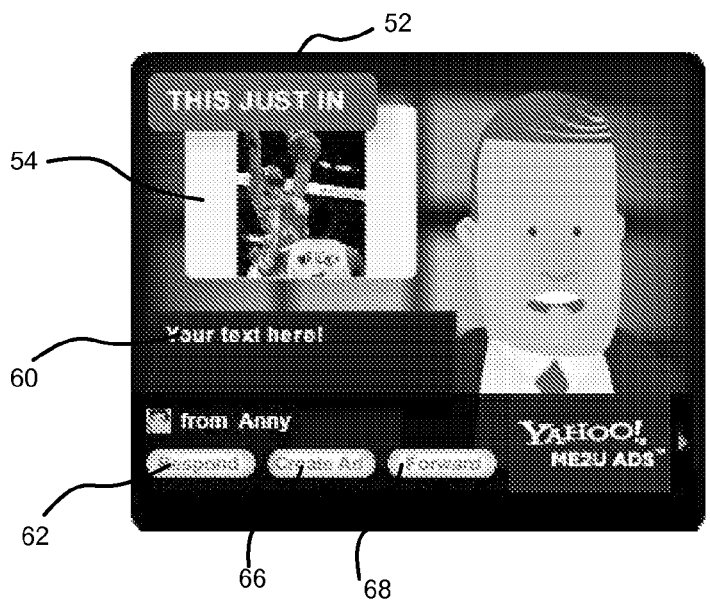
FIGS. 5A-5C illustrate an exemplary process and screens for forwarding a personalized targeted advertisement, in accordance with one embodiment of the present invention.
Figure 5B:
Figure 5C:
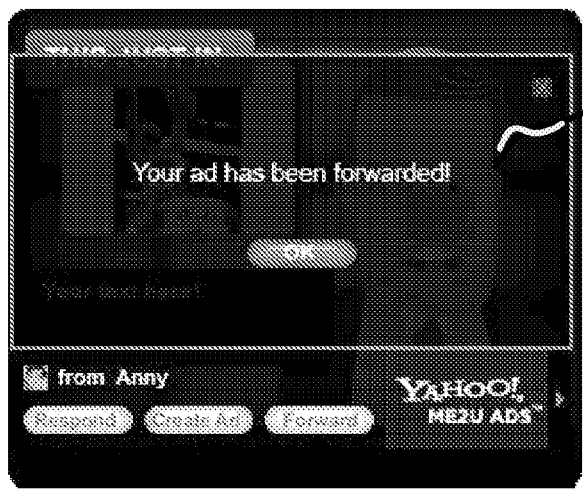

Referring back to FIG. 1, as illustrated, an exemplary personalized targeted advertisement includes a forward button 68. In other embodiments, the buttons may be replaced by corresponding Internet links or URLs. The forward button 68 can be used to forward the personalized targeted advertisement 52 to another recipient. FIGS. 5A to 5C illustrate an exemplary process of forwarding a personalized targeted advertisement 52 to another recipient. In one embodiment, when the forward button 68 is selected or clicked, the face of the targeted advertisement 52 changes to show a user identity box 132 and a send button 134. One or more user identities (e.g., email id, user name, etc.) can be entered in the user identity box 132. When the send button 134 is clicked, the personalized targeted advertisement 52 is forwarded to the recipients that were listed in the user identity box 132. In one embodiment, a message 136 is shown on success of the forward operation.

Figure 6A:
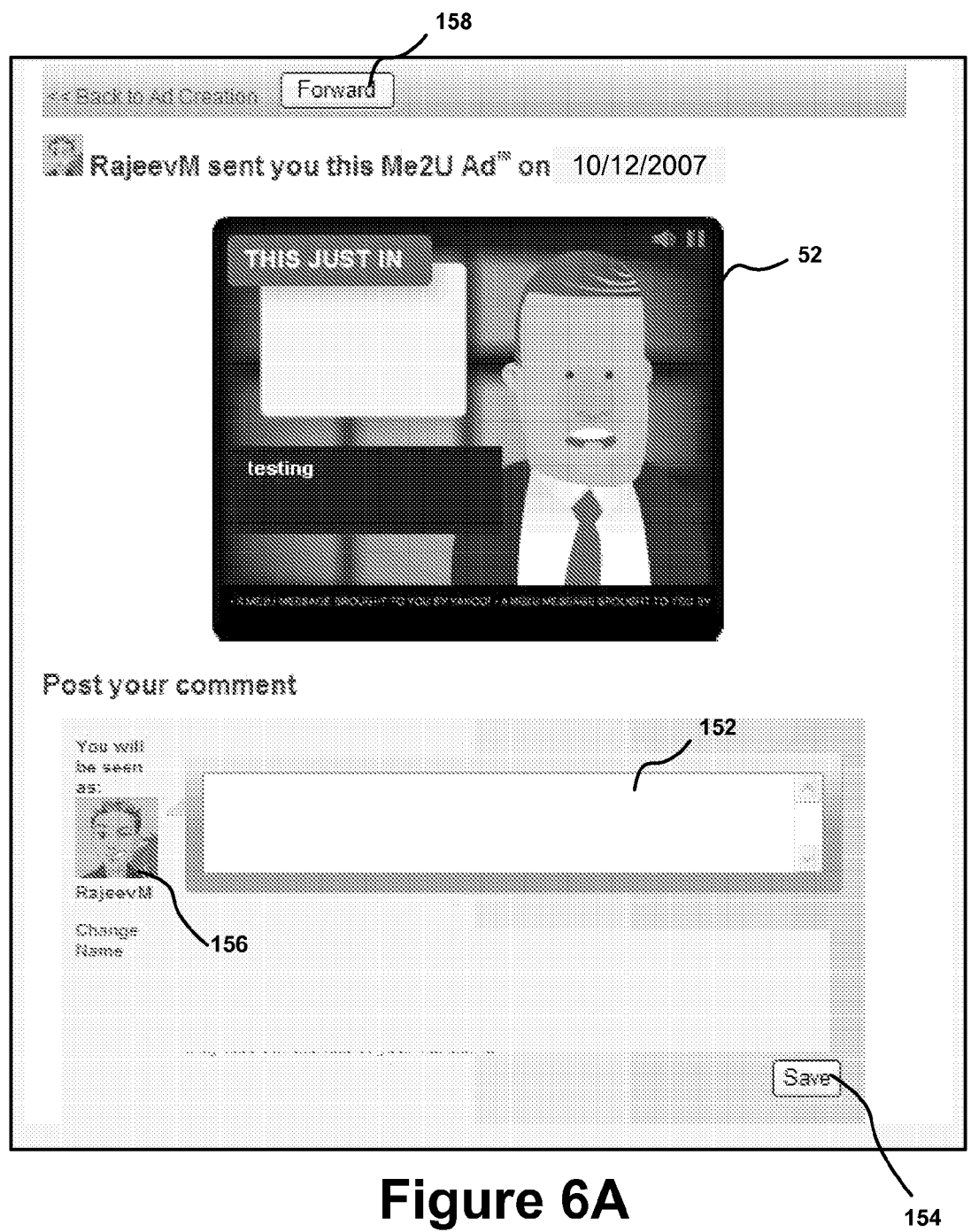
FIGS. 6A and 6B illustrate exemplary processes and screens for responding to a personalized targeted advertisement, in accordance with one embodiment of the present invention.

Similarly, the respond button 62 on the personalized targeted advertisement 52 can be used to respond to the sender of the personalized targeted advertisement 52. When the respond button 62 is clicked, the user is presented with a screen, as illustrated in FIG. 6A in one embodiment and FIG. 6B in another embodiment. The respond screen, in one embodiment, includes a space to display the personalized targeted advertisement 52 that is being responded. The respond screen further includes a response box 152 for entering a response and a save button 154 to save the response. The response screen may also include identity 156 of the user who is responding to the received personalized targeted advertisement. In one embodiment, the response screen may also include a forward button 158 to forward a targeted advertisement to other recipient as discussed in FIGS. 5A-5C.

Figure 6B:
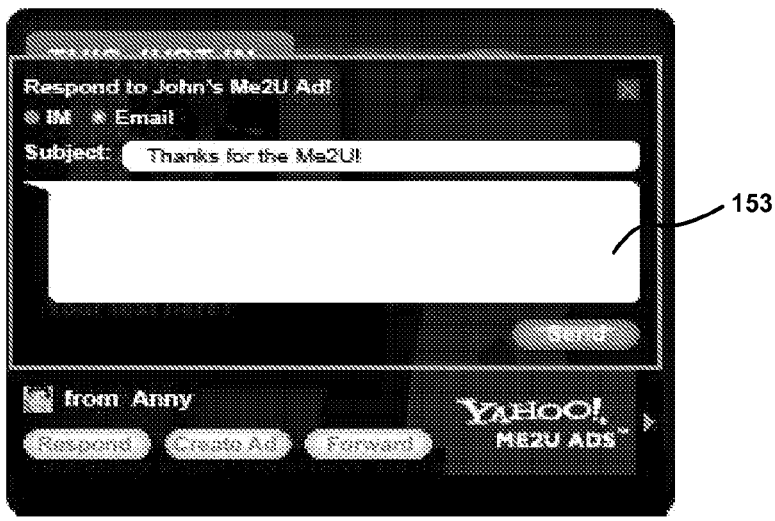

FIG. 6B illustrates another embodiment of the "Respond" screen. In this screen, the recipient may choose to respond directly to the sender of the personalized targeted advertisement via the instant messaging process (e.g., using a publicly available Instant Messenger (IM) product such as Yahoo Messenger). Alternatively, a response may be sent via email. A subject can be entered in the subject box and a message is entered in the message box 153. The response is transmitted to the sender when the send button is selected or clicked. In one embodiment, the screen as illustrated in FIG. 6B can also enable the recipient to select the IM address of the sender of the personalized targeted advertisement. In another embodiment, the advertising server is aware of the IM address of the sender.

Figure 7:
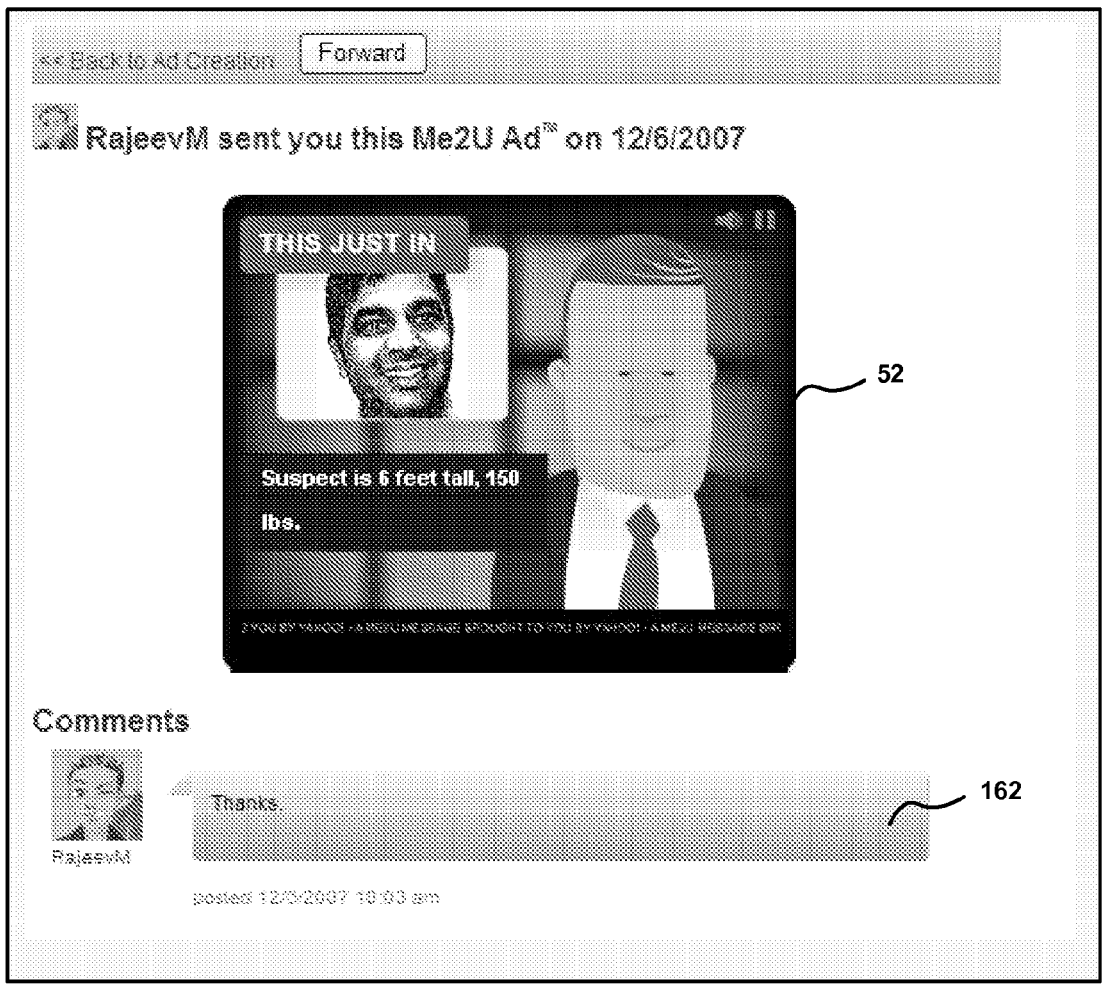
FIGS. 7 illustrates an exemplary webpage for showing saved comments for a personalized targeted advertisement, in accordance with one embodiment of the present invention

The response, as entered in response box 152, is stored on a server and placed in the inbox of the sender. This process of keeping track of sent and received targeted advertisements and responses is discussed in more detail in FIG. 8. FIG. 7 illustrates an exemplary screen to show an entered response 162 when the save button 154 (FIG. 6) is clicked. In one embodiment, the responses are saved in the inbox of the sender of the original personalized targeted advertisement 52. In other embodiment, a notification is sent to the sender of the original personalized targeted advertisement 52 when a response is entered by the recipient. The notification may be sent via email, SMS, Instant messaging, etc.

In one embodiment, when the personalized targeted advertisement is received by the server, a flag is set at the targeted advertisement sever to indicate that a particular recipient has a personalized targeted advertisement waiting to be displayed when this particular recipient visits a particular website or webpage. In another embodiment, a notification is also sent to the recipient. The notification is sent to inform the recipient that a personalized message (e.g., targeted advertisement) is waiting for the recipient. One added advantage of sending this notification is to encourage the recipient to visit the website.

Figure 8:
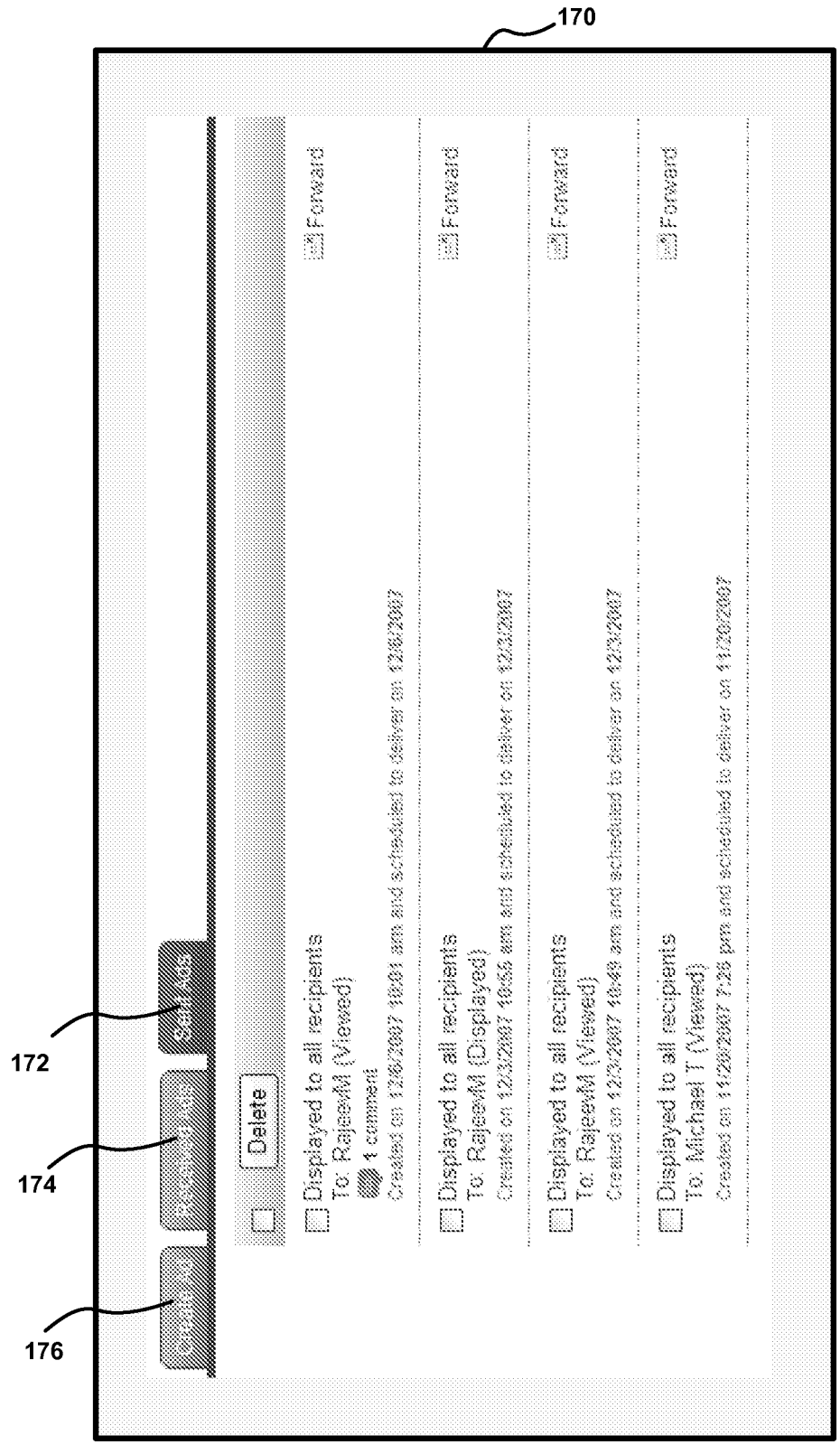
FIG. 8 illustrates an exemplary webpage to manage created and received personalized targeted advertisement, in accordance with one embodiment of the present invention.

FIG. 8 illustrates an exemplary inbox screen 170 of a user of the targeted advertisement system. The inbox screen 170, in one embodiment, includes a create advertisement tab 176 that can be used to create a personalized targeted advertisement. In one embodiment, clicking of create button 66 (FIG. 1) leads to display of the content of the screen associated with the create advertisement tab 176. Received advertisement tab 174 displays a list of all received targeted advertisements. Similarly, the sent advertisement tab 172 displays a list of all sent targeted advertisements. In one embodiment, responses entered by the recipients for a particular targeted advertisement are also indicated in the list of sent advertisements. A delete button may be provided in one embodiment to remove one or more entries from the lists of received and sent advertisements. The inbox is maintained on a server and accessible to the user of the targeted advertisement system via the Internet.

Figure 9:
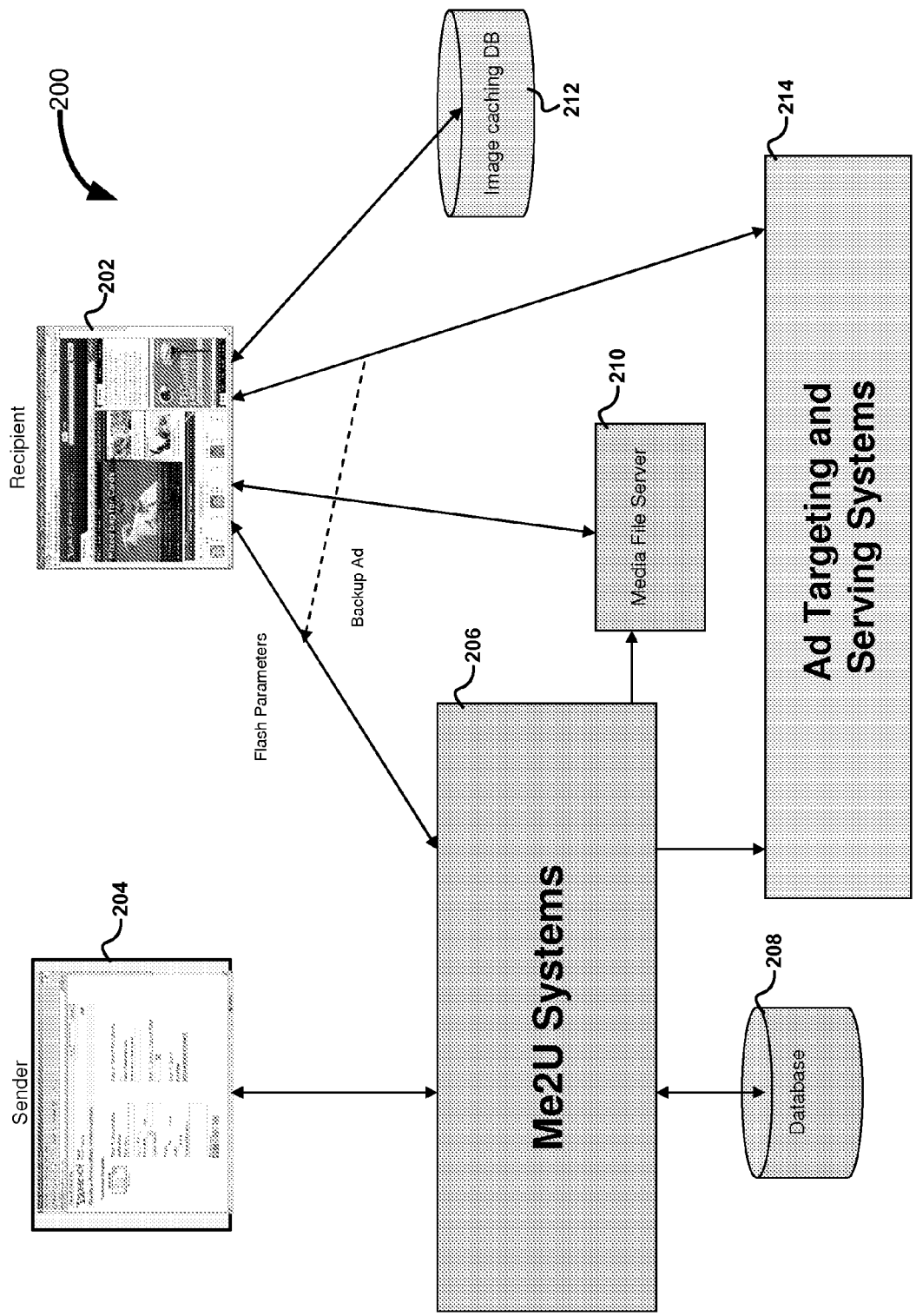
FIG. 9 illustrates an exemplary system for sending, storing and receiving a personalized targeted advertisement, in accordance with one embodiment of the present invention.

FIG. 9 illustrates an exemplary targeted advertisement system 200. The targeted advertisement system 200, in one embodiment, includes a database 208 to store the templates and sent/received targeted advertisements. The targeted advertisement system 200 also includes a targeted advertisement generator module 206 (shown as Me2U Ads systems in FIG. 9). The targeted advertisement generation module 206 is in communication with an advertisement serving system 214 for creation, management, and display of the personalized targeted advertisements. A media file server 210 is provided to store and manage media files associated with the targeted advertisements. The targeted advertisement system 206 (or its components), in embodiment, is also in communication with other external systems to access user identities, address book, user names, etc. The targeted advertisement generator module 206 is in communication with the sender's Internet browser 204 to enable creation and management of the targeted advertisements. The targeted advertisement generator module 206 is also in communication with the recipient's Internet browser 202 for displaying the targeted advertisement and management of received targeted advertisement and responses to the targeted advertisements. The Internet browser 202 is in communication with an Image caching database 212 to store, cache and manage images and media files that are associated with the personalized targeted advertisements. The sender's Internet browser 204 may also communicate a similar database (not shown) for the same purpose.

Figure 10:
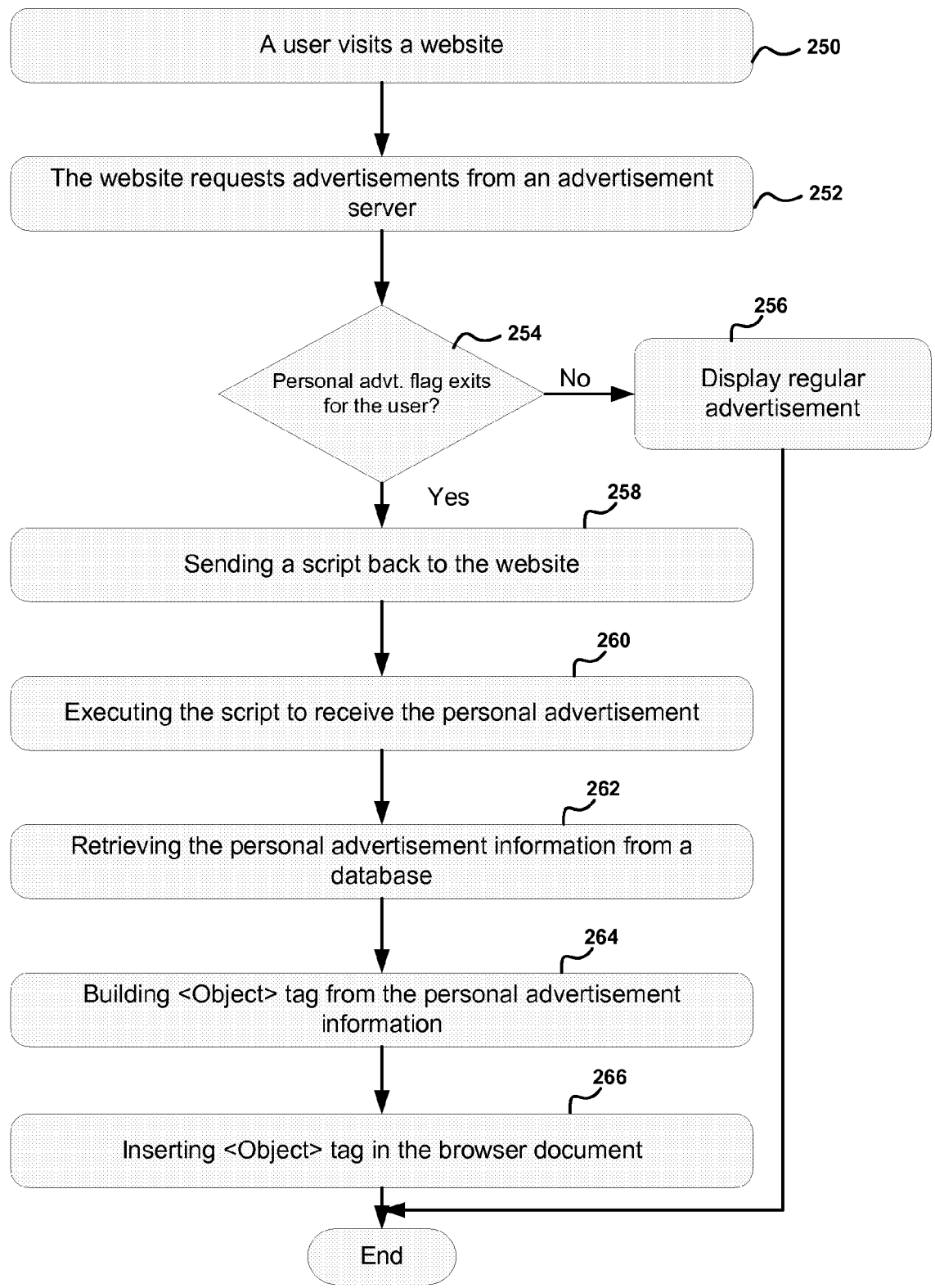
FIG. 10 illustrates an exemplary method of displaying a personalized targeted advertisement to a receiver, in accordance with one embodiment of the present invention.

FIG. 10 illustrates a flow diagram of a process of displaying a personalized targeted advertisement. The process begins at operation 250 in which a user visits a website that is associated with the personalized targeted advertisement system 200 (FIG. 9). The website in operation 252 requests Internet advertisements from an advertisement server. The advertisement server in operation 254 checks for the flag or a similar indicative data to determine if one or more personalized targeted advertisements exist for the user. If no personalized targeted advertisement exists for the user, a regular advertisement is displayed on the webpage of the visited website and the process ends. However, if at least one personalized targeted advertisement exists for the user, the advertisement server in operation 258 sends a script back to the Internet browser of the user (i.e., recipient of the personalized targeted advertisement). The script is executable in the Internet browser. In operation 260, the Internet browser of the user executes the script to retrieve the personalized advertisement. In operation 262, the personalized advertisement information is retrieved from the database associated with the advertising server. In one embodiment, the personalized advertisement information includes information such as a custom or a personalized message, template identification, links to media file, etc. After receiving this information, in one embodiment, in operation 264, the Internet browser builds an "Object" tag to be inserted in the HTML code of the webpage. In other embodiment, the personalized targeted advertisement system builds this "Object" tag. In operation 266, the "Object" tag is inserted in the website HTML code and a personalized targeted advertisement is created by customizing and filling necessary information in the template that is indentified by the targeted advertisement information. The personalized targeted advertisement is then displayed in the webpage on the Internet browser. In one embodiment, a notification is sent to the sender when the personalized targeted advertisement is displayed on the Internet browser of the recipient.

In one embodiment, if there are more than one personalized targeted advertisement exist for the user, the server selects the first one in the list and then the subsequent advertisement in the list during a subsequent visit by the user to the website. In one embodiment, a personalized targeted advertisement is displayed only once. After displaying the last personalized targeted advertisement in the list, the flag at the advertisement server is set to false. In other embodiments, the sender, or the recipient, or both can control this aspect of the display of the personalized targeted advertisement through relevant property settings in the targeted advertisement system.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for providing direct communication from personalized targeted advertising and related functionality as described in this document, are stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A method for enabling a user to create a personalized targeted advertisement by interfacing with an advertising server, the personalized targeted advertisement defined for display on a webpage of a website, the personalized targeted advertisement having features to provide direct communication between the user and a recipient of the personalized targeted advertisement, at the advertising server the method comprising:

detecting selection by a user, of an advertisement template, from a plurality of advertisement templates, in order to create the personalized targeted advertisement;

receiving a media file from the user that is to be displayed in the personalized targeted advertisement;

receiving a custom message from the user for the personalized targeted advertisement; and receiving an unique identification from the user that identifies the recipient of the personalized targeted advertisement, the unique identification being used to notify the advertising server that a personalized targeted advertisement needs to be displayed when the recipient accesses the webpage and when displayed also identifies the user that created the personalized targeted advertisement, the webpage being in communication with the advertising server, the advertising server having storage for storing the personalized targeted advertisement;

wherein the unique identification is of one or more specific email addresses;

providing a plurality of Internet links, each of the plurality of Internet links being embedded in the personalized targeted advertisement, at least one of the plurality of Internet links enables communication between the user and the recipient;

wherein the method is executed by a computing processor.

2. The method as recited in claim 1, wherein the advertisement template provides placeholders for the media file and the custom message.

3. The method as recited in claim 1, wherein the custom message is one of a text format, or an audio format.

4. The method as recited in claim 1, wherein the detecting includes identifying a default advertisement template if no selection of the advertisement template is detected.

5. The method as recited in claim 1, further comprising:
providing a personalized targeted advertisement inbox for tracking activity associate with the personalized targeted advertisement.

6. The method as recited in claim 1, wherein the plurality of Internet links being used to format a variable to be used in a web-media player during a display of the personalized targeted advertisement.

7. The method as recited in claim 1, wherein the personalized targeted advertisement includes a forward button to enable forwarding the personalized targeted advertisement to another recipient.

8. The method as recited in claim 1, wherein the personalized targeted advertisement includes a respond button to enable entering a response to the personalized targeted advertisement.

9. A method of providing direct communication between a creator and a recipient of a personalized targeted advertisement on a webpage, comprising:
at the webpage, detecting access by the recipient and notifying an advertisement server of such access, and receiving from the advertisement server the personalized targeted advertisement, the receiving includes,
receiving a custom message from the advertisement server, the custom message being one previously created by the creator for the personalized targeted advertisement;
receiving a media file for the personalized targeted advertisement, as previously provided by the creator;
receiving a plurality of Internet links for the personalized targeted advertisement, at least one of the plurality of Internet links enables communication between the creator and the recipient through the personalized targeted advertisement;
receiving an identification of an advertisement template from the advertisement server, the advertisement template is selected by the creator of the personalized targeted advertisement; and
at the webpage, building an Object tag using the custom message, at least one of the plurality of Internet links, the media file, and the advertisement template, and the Object tag being included in HTML code of the webpage for displaying the personalized targeted advertisement;
wherein the personalized targeted advertisement is displayed at the webpage based on the detected access and identification of the recipient that was identified as a target of the personalized targeted advertisement by the creator by using an email address of the recipient, the personalized targeted advertisement identifying the creator when displayed to the recipient;
wherein the method is executed by a computing processor.

10. The method as recited in claim 9, further comprising:
providing a personalized targeted advertisement inbox for tracking the personalized targeted advertisement.

11. The method as recited in claim 9, wherein the plurality of Internet links being used to format a variable to be used in web-media player during a display of the personalized targeted advertisement.

12. The method as recited in claim 9, wherein the advertisement server returns a normal non-personalized advertisement if no personalized targeted advertisement is found for the recipient.

13. The method as recited in claim 9, wherein the advertisement template defines association of communication buttons in the personalized targeted advertisement with the plurality of Internet links.

14. The method as recited in claim 9, wherein if the advertisement template is not selected by the creator, a default advertisement template is used.

15. The method as recited in claim 9, wherein the building of the Object tag includes using variable names and formatting that are in conformity with requirements of a web-media player.

16. A system for providing direct communication between a creator and a recipient of a personalized targeted advertisement on a webpage, the system comprising:
a media file server to store and manage a plurality of media files associated with the personalized targeted advertisement, the media file server defined to be in communication with a web server, the webpage is managed by the web server;
an advertisement server having a processor, the advertising server being in communication with the web server; and
a targeted advertisement component in communication with the advertisement server and the web server, the targeted advertisement component configured to construct an Object tag that is embedded in HTML code of the webpage, and detecting when the recipient identified, by an email, by the creator, accesses the webpage, the detecting triggering communication by the advertisement server that requests at least requests at least some of the plurality of media files from the media file server for rendering the personalized targeted advertisement on the webpage when the recipient accesses the webpage;
wherein the personalized targeted advertisement includes communication options for enabling communication between the creator and the recipient directly from the personalized targeted advertisement, the personalized targeted advertisement includes therein identification of the creator that provided the email of the identified recipient.

17. The system as recited in claim 16, wherein the targeted advertisement component constructs the Object tag using a plurality of Internet links, a custom message, a targeted advertisement template identification, and a media file.

18. The system as recited in claim 17, further including a web-media player defined to parse and execute the Object tag embedded in the HTML code.

19. The system as recited in claim 16, wherein the advertisement server includes storage to store the targeted advertisement component.

* * * * *